(12) United States Patent  (10) Patent No.: US 7,142,263 B2
Nagata                    (45) Date of Patent:     Nov. 28, 2006

(54) DISPLAY DEVICE HAVING REPAIR WIRING WITH SECTIONS INSULATED FROM ONE ANOTHER

(75) Inventor: Katsunori Nagata, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 74 days.

(21) Appl. No.: 10/799,635

(22) Filed: Mar. 15, 2004

(65) Prior Publication Data

US 2004/0189927 A1    Sep. 30, 2004

(30) Foreign Application Priority Data

Mar. 27, 2003 (JP) .............................. 2003-087401

(51) Int. Cl.
  *G02F 1/1333*   (2006.01)
  *G02F 1/1345*   (2006.01)
  *G02F 1/13*     (2006.01)
  *G09G 3/36*     (2006.01)

(52) U.S. Cl. .................. 349/54; 349/40; 349/152; 349/192; 345/92

(58) Field of Classification Search ................ 349/40, 349/54, 55, 192, 149–152; 345/92, 93
See application file for complete search history.

(56) References Cited

U.S. PATENT DOCUMENTS

| 4,840,459 A * | 6/1989 | Strong ........................ 349/55 |
| 5,045,753 A   | 9/1991 | Katayama et al. ........... 313/494 |
| 5,164,851 A   | 11/1992 | Kanemori et al. ............ 349/55 |
| 5,212,574 A   | 5/1993 | Katayama et al. ........... 349/38 |
| 5,335,102 A   | 8/1994 | Kanemori et al. ............ 349/55 |
| 5,731,854 A * | 3/1998 | Kishida ........................ 349/40 |
| 5,781,253 A * | 7/1998 | Koike et al. .................. 349/40 |
| 5,995,178 A   | 11/1999 | Fujikawa et al. .............. 349/55 |
| 6,072,559 A   | 6/2000 | Kanemori et al. ........... 349/192 |
| 6,111,558 A * | 8/2000 | Jeung et al. .................. 345/93 |
| 6,340,963 B1* | 1/2002 | Anno et al. .................... 345/92 |
| 6,342,931 B1  | 1/2002 | Nagata et al. ................. 349/54 |
| 6,380,992 B1* | 4/2002 | Lee ............................. 349/54 |
| 6,429,910 B1* | 8/2002 | Hirata et al. .................. 349/54 |
| 6,462,792 B1  | 10/2002 | Ban et al. ..................... 349/38 |
| 6,791,634 B1* | 9/2004 | Ichioka et al. ................ 349/55 |
| 6,864,937 B1* | 3/2005 | Moon et al. ................. 349/139 |

FOREIGN PATENT DOCUMENTS

JP   08-292442   11/1996
JP   11-271722   10/1999

(Continued)

*Primary Examiner*—Tarifur R. Chowdhury
(74) *Attorney, Agent, or Firm*—Nixon & Vanderhye P.C.

(57) ABSTRACT

Provided is a display device featuring its capability to securely prevent static electricity from intruding into spare wiring units preset in a display panel and prevent the display device itself from becoming larger dimensionally. A plurality of terminals of signal wirings and a plurality of terminals of spare wiring units respectively linking with a tape carrier package (TCP) are disposed to an end of a TFT substrate for constituting the display panel. Each of the terminals of the spare wiring units is divided into two parts, which are arranged to be discontinuous on the halfway. An open space is formed in each of the tape carrier package so as to cause the spare wiring terminals to be exposed externally via the open space. When any of the signal wirings has been disconnected, the disconnected signal wiring is connected to a spare wiring followed by a process for interconnecting the two portions of the terminal of the corresponding spare wiring, thereby completing a predetermined repairing process against the faulty wire connection.

4 Claims, 4 Drawing Sheets

FOREIGN PATENT DOCUMENTS

| | | |
|---|---|---|
| JP | 2002-040481 | 2/2002 |
| JP | 2002-174820 | 6/2002 |

* cited by examiner

DISPLAY DEVICE HAVING REPAIR WIRING WITH SECTIONS INSULATED FROM ONE ANOTHER

This nonprovisional application claims priority under 35 U.S.C. § 119(a) on Patent Application No. 2003-087401 filed in Japan on Mar. 27, 2003, the entire contents of which are hereby incorporated by reference.

BACKGROUND OF THE INVENTION

1. Field of the Invention

The present invention relates to a matrix-type display device, which is capable of repairing defective connection of a scanning line or a signal line required for driving the display device.

2. Description of the Prior Art

In order to repair a disconnected data signal wiring or a scanning signal wiring disposed in a display panel, conventional matrix-type display devices are internally fitted with spare wirings. An example of a schematic front view of a conventional matrix-type display panel is shown in FIG. 7. FIG. 7 exemplifies a conventional active matrix type liquid crystal display panel, which accommodates a liquid crystal layer on a substrate 10 consisting of a plurality of thin-film transistors (TFT) and then a substrate 20 having a color filter (CF) is laminated on the liquid crystal layer so as to complete assembly of an active matrix type display device. A number of tape carrier packages (TCP) 30 each consisting of an IC package using a tape film are tightly secured to the edge portion of the TFT substrate 10. Data signals are output from the TCP packages 30, which are horizontally aligned in FIG. 7, whereas scanning signals are output from the vertically aligned TCP packages 30 in FIG. 7.

In the event that either a data signal wiring or a scanning signal wiring has been disconnected, the disconnected signal wiring 40 is connected to a spare wiring 50 at an intersection 45 between them by way of fusing both wirings by applying, for example, a laser beam. In consequence, this results in the restored normal connection of one of identical signal wirings 40 thus far directly incurred disconnection via linkage through a discrete route that exists among a plurality of TCP packages 30.

In the case of a conventional display device, in order to provide a spare wiring with an antistatic effect, as previously proposed in the Japanese Laid-Open Patent Application No. H11-271722, by providing a protecting circuit, this preceding art related to the above-cited patent publication aimed at suppressing externally intruding ESD (external static discharge). In addition, as proposed via another Japanese Laid-Open Patent Application No. 2002-174820, in addition to the provision of a circuit analogous to the above-cited protection circuit, the latter art related to the above-cited patent publication aimed at coping with static charge by way of providing a dummy spare wiring.

However, it is essential for the above-cited conventional arts to necessarily provide a protection circuit and a dummy spare wiring merely for the purpose of protecting a spare wiring from the electrostatic charge. Furthermore, there is a critical limit in terms of countermeasure to cope with electrostatic charge without pursuing any further means so as to inhibit intrusion of an extremely large volume of static electricity. Further, provision of the protection circuit and the dummy spare wiring potentially hinders the down-sizing and cost reduction of the display device.

SUMMARY OF THE INVENTION

The main object of the present invention is to provide a display device, which is capable of securely preventing static electricity from intruding into a spare wiring, and further capable of facilitating down-sizing of the display device so as to prevent the dimension of the display device from being expanded.

To achieve the above object, in the present invention, a display device is provided with a display panel that has a spare wiring with which to repair imperfect connection in a signal wiring. Here, a terminal portion of the spare wiring is composed of first and second portions that are separated from each other. Inasmuch as the first portion is not electrically connected to the second portion, even the least static electricity can securely be prevented from intruding into the display panel via the terminal components.

Advisably, the first and second portions of the terminal portion of the spare wiring are located at separate positions on the same surface of the display panel. Alternatively, the first and second portions of the terminal portion of the spare wiring are located at positions separate in a direction perpendicular to the display surface of the display panel According to the above display device related to the present invention, when any of the signal wiring units has been disconnected, by connecting the intersection between the disconnected signal wiring and the spare wiring and connecting the first portion to the second portion of the terminal component of the spare wiring, it is possible to restore the signal wiring into the normally connected condition.

Inasmuch as the display device related to the present invention provides the terminal components of each of the spare wiring units with a specific discontinuous portion, it is possible to securely prevent unwanted electric load from intruding into the display panel via external sources, thereby making it possible to minimize generation of the reject caused by external static discharge (ESD), thus eventually contributing to the improved yield. Further, inasmuch as the display device of the present invention can dispense with the needs to implement antistatic measures by separately providing a protection circuit or a dummy spare wiring, it is possible to facilitate the down-sizing of the display device and also facilitate reduction of the production cost as well. Further, disconnection of the signal wiring or the scanning wiring can readily be restored into the normally connected condition via repair.

BRIEF DESCRIPTION OF THE DRAWINGS

The above and further objects and features of the present invention will become clearer from the following description, taken in conjunction with the preferred embodiments with reference to the accompanying drawings in which.

DESCRIPTION OF THE PREFERRED EMBODIMENTS

Figure 1:
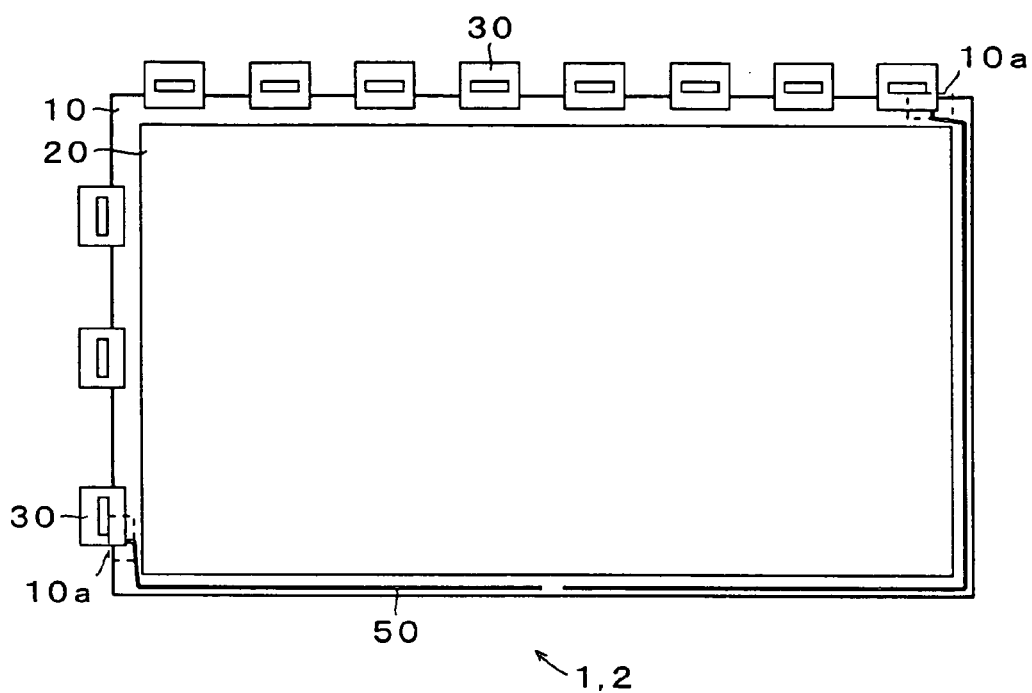
FIG. 1 is a simplified front view for schematically illustrating an overall constitution of a display panel of the display device according to the first and second embodiments of the present invention.

Referring now to the accompanying drawings, practical forms for implementing the present invention are described below. FIG. 1 schematically illustrates an overall constitution of a display panel 1 of the display device according to the first embodiment of the present invention as viewed from the front surface side of the display panel 1.

The display panel 1 corresponds to an active matrix type liquid crystal panel, which consists of a substrate 10 comprising a plurality of thin film transistors (TFT) accommodating a liquid crystal layer loaded on the substrate 10, wherein a substrate 20 having a color filter (CF) is eventually laminated on the liquid crystal layer so as to complete assembly of an active matrix type liquid crystal panel. Tape carrier packages (TCP) 30 are tightly secured to the edge portion of the TFT substrate 10. Data signals are output from the tape carrier packages 30 aligned in the horizontal direction shown in FIG. 1, whereas scanning signals are output from the tape carrier packages 30 aligned in the vertical direction shown therein.

Figure 2:
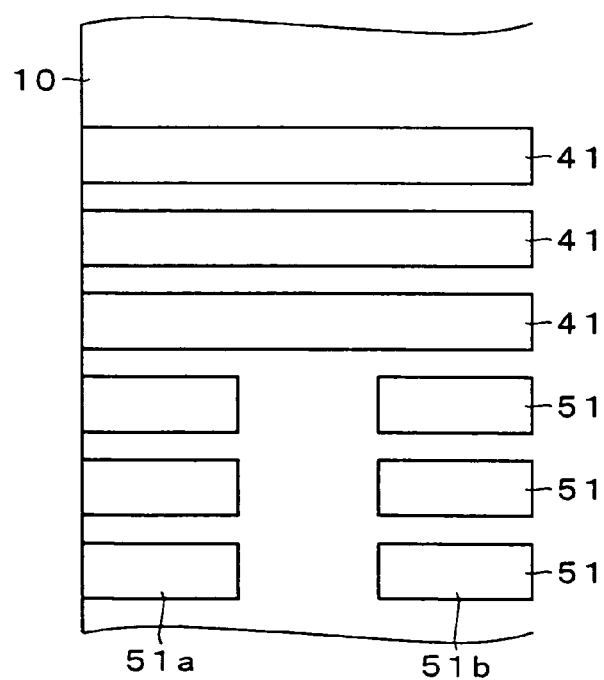
FIG. 2 is a simplified front view for schematically illustrating the peripheral portions of wiring terminals disposed inside of the display panel of the display device according to the first embodiment of the present invention.

One of portions 10a of the TFT substrate 10 enveloped with a broken line is exemplified via an enlarged front view shown in FIG. 2. These portions of the TFT substrate 10 respectively accommodate a plurality of terminals 41 of the data signal wiring or of the scanning signal wiring, wherein these terminals 41 respectively reach the side edge of the TFT substrate 10 and are linked with terminals disposed on the tape carrier packages 30. Further, a plurality of terminals 51 of spare wiring units are also provided, which are respectively discontinuous on the halfway. Concretely, a local portion 51a linked with the terminal disposed on the tape carrier packages 30 is separated from a local portion 51b linked with the spare wiring units 50 within an identical plane in the direction along the TFT substrate 10. These two local portions 51a and 51b are discrete from each other across a distance ranging from a minimum of 10 μm to a maximum of 100 μm for example.

Figure 3:
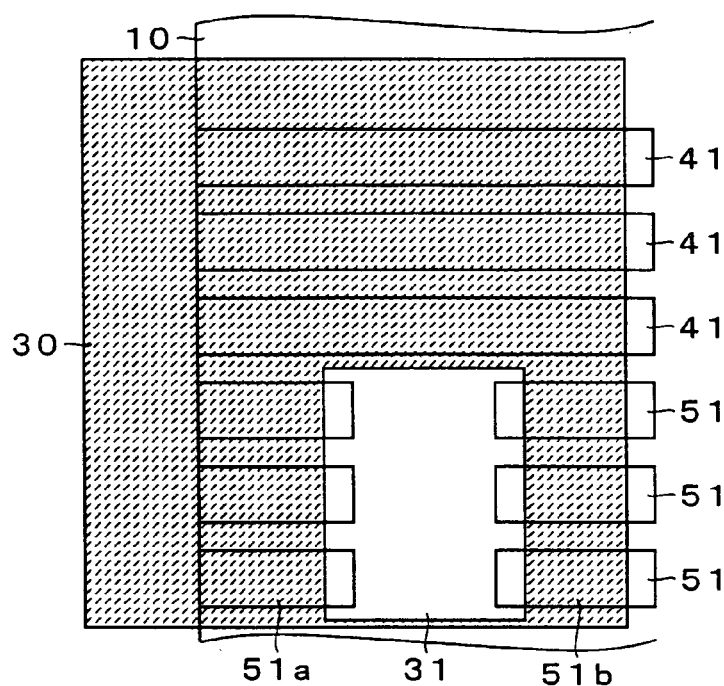
FIG. 3 is a simplified front view for schematically illustrating the peripheral portions of wiring terminals including a tape carrier package disposed inside of the display panel of the display device according to the first embodiment of the present invention.

FIG. 3 presents a front view for explanatory of the state in which the tape carrier package 30 is bonded to the structural components of the TFT substrate 10 shown in FIG. 2. Those discontinuous portions 51a and 51b among the spare wiring terminals 51 are respectively exposed to external atmosphere via an open space 31 formed in the tape carrier package 30.

Figure 7:
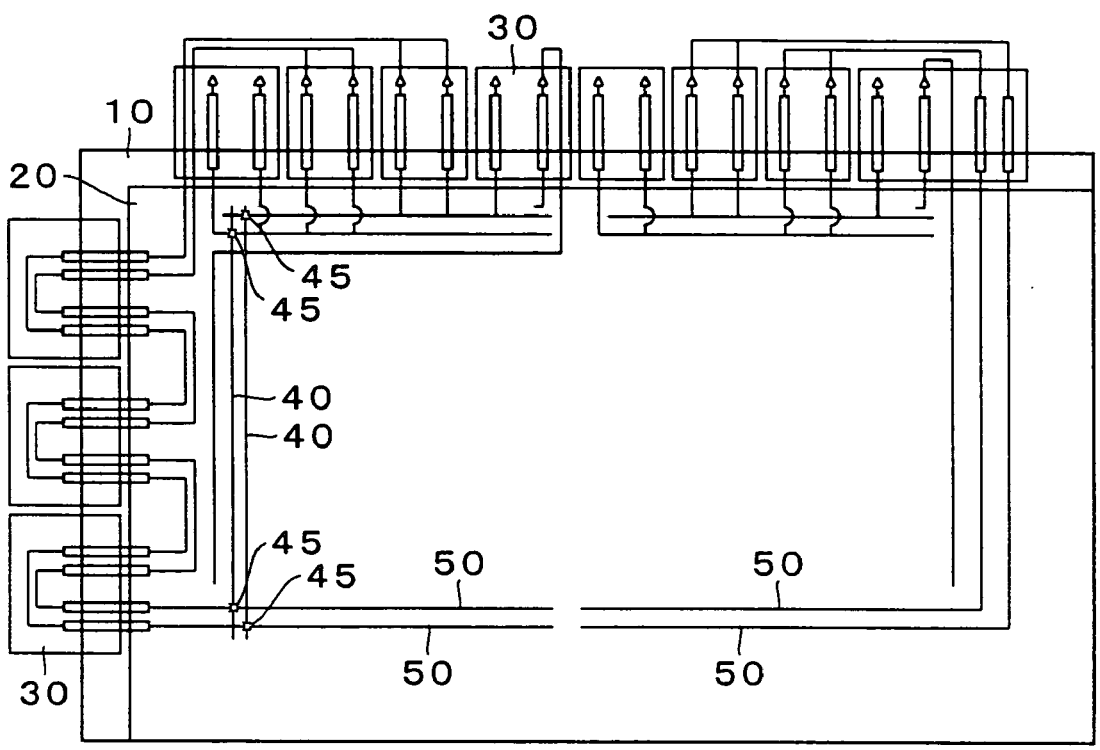
FIG. 7 is a front view for schematically illustrating an overall constitution of a conventional display panel and a method for repairing the disconnected wirings before restoring into a normal wiring condition.

When the data signal wiring or the scanning signal wiring has been disconnected in the display panel 1, as shown in FIG. 7, it is so arranged that the disconnected data signal wiring 40 is connected to one of the spare wiring units 50 at an intersection 45 between them via a fusing process, and then one of the local portions 51a of one of the spare wiring terminals 51 is connected to the corresponding portion 51b via the open space 31 of the tape carrier package 30, thereby completing a repair process. As a result, among a plurality of identical signal wirings 40, the faulty portion that directly incurred disconnection has restored its normal connection via a discrete route through a plurality of the tape carrier packages 30, thus completing a repairing process against faulty connection.

Figure 4:
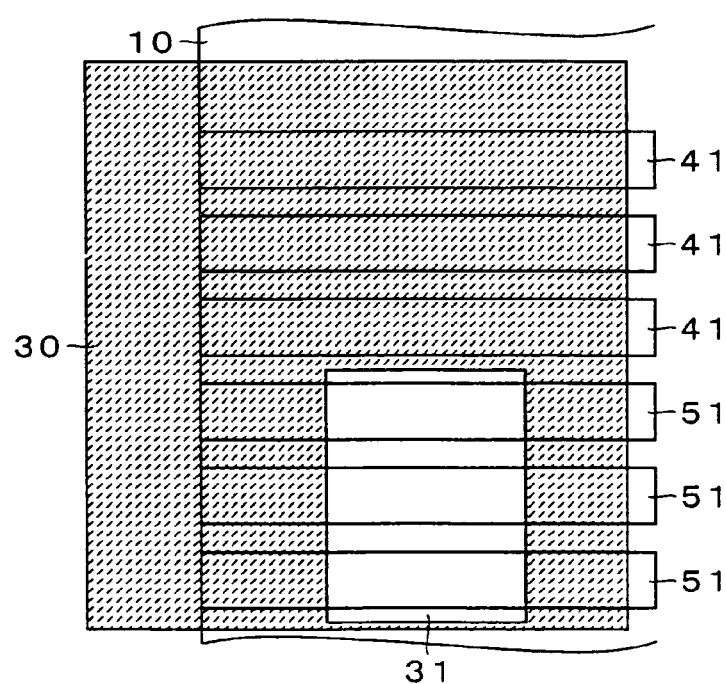
FIG. 4 is a simplified front view for schematically illustrating the peripheral portions of wiring terminals including a tape carrier package after restoration into the normal condition via a repair process executed for the display panel of the display device according to the first embodiment of the present invention.

FIG. 4 concretely illustrates the state upon completion of the mutual connection between the above-referred opposite local portions 51a and 51b of the spare wiring terminals 51. The connection between these opposite local portions 51a and 51b can be implemented by introducing either the plasma CVD (Chemical Vapor Deposition) method, or the paste-coating with a needle, or the ink-jet coating process, as required. The art pertaining to the paste-coating with a needle is described in the Japanese Laid-Open Patent Publication No. H8-292442.

Next, a display panel 2 of the display device according to the second embodiment of the present invention is described below. This display panel 2 is obtained by modifying the display panel 1 of the first embodiment. Specifically, in the display panel 2, a pair of local portions 51a and 51b of the spare wiring terminals 51 are respectively disposed so as to remain, as in the first embodiment, in the discontinuous state, but in a different manner. The overall constitution of the display panel 2 is identical to the one shown in FIG. 1.

Figure 5:
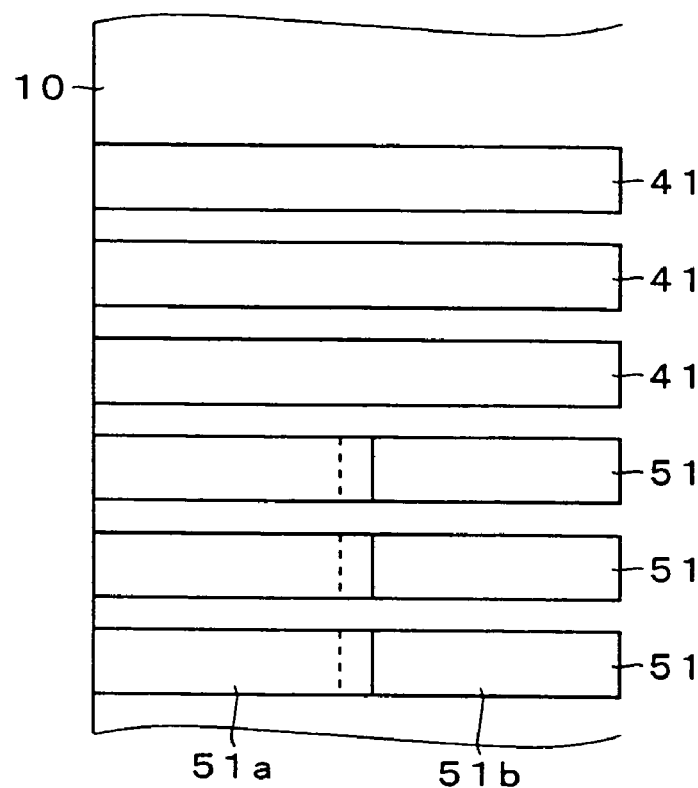
FIG. 5 is a simplified front view for schematically illustrating the peripheral portions of wiring terminals disposed inside of the display panel of the display device according to the second embodiment of the present invention.
Figure 6:
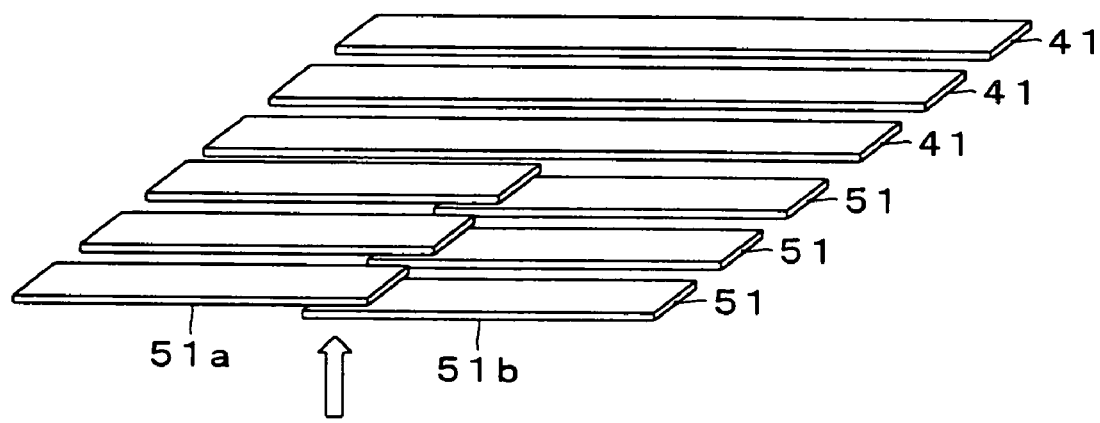
FIG. 6 is a perspective view for schematically illustrating the peripheral portions of wiring terminals disposed inside of the display panel of the display device according to the second embodiment of the present invention.

One of portions 10a enveloped with a broken line in FIG. 1 is shown in FIG. 5 via an enlarged front view and also shown via a perspective view in FIG. 6. Each of the spare wiring terminals 51 consists of a dual layer constitution, in which, by forming an insulating film (not shown) at a location between an individual portion 51a linked with a corresponding terminal disposed on the tape carrier package 30 and the other individual portion 51b linked with a corresponding spare wiring 50, these portions 51a and 51b are separated from each other in the direction perpendicular to the display surface of the display panel 2. As shown via an arrowed symbol in FIG. 6, one ends of the two portions 51a and 51b are disposed in opposition from each other. Although not shown, one ends of the two portions 51a and 51b are externally exposed via the open space 31 formed in the tape carrier packages 30.

When either the data signal wiring or the scanning signal wiring has been disconnected in the display panel 2, as shown in FIG. 7, the disconnected signal wiring 40 is connected to one of the spare wiring units 50 at an intersection between them via a fusing process, and further, one of the portion 51a and one of the opposite portions 51b among a plurality of spare wiring terminals 51 are linked with each other, thereby completing a repair process. Mutual connection between the portions 51a and 51b can be implemented by a fusing process by applying laser beam for example.

Application of an LCD panel has been exemplified in the above practical forms for implementing the present invention. It should be understood however that the present invention is also applicable to a variety of display panels such as an organic electro-luminescent display panel, or the like, as well.

It is apparent from the above description that various modification and variations may be added to the present invention. Accordingly, it should be understood that the present invention may be implemented within the scope of the following Claims without necessarily being bound to the above-referred concrete description related to the present invention.

What is claimed is:

1. A display device comprising:
a display panel comprising a spare wiring with which to repair imperfect connection in a signal wiring,
wherein a terminal portion of the spare wiring is composed of first and second portions that are separated and electrically isolated from each other, and
wherein the first portion is so disposed as to reach an edge of a substrate of the display panel and be linked with a terminal disposed on a tape carrier package, and the second portion is so disposed as to be linked with the spare wiring.

2. The display device according to claim 1, wherein the first and second portions of the terminal portion of the spare wiring are located at separate positions on a same surface of the display panel.

3. A method of repairing the display device according to claim 1, comprising when the signal wiring is broken, connecting the signal wiring to the spare wiring at an intersection therebetween and connecting together the first and second portions of the terminal portion of the spare wiring.

4. The display device of claim 1, wherein an open space is formed in the tape carrier package, and
a part of the first portion, a portion separating the first and second portions, and a part of the second portion are exposed to external atmosphere via the open space.

* * * * *